(12) United States Patent
Chin et al.

(10) Patent No.: US 11,583,014 B1
(45) Date of Patent: Feb. 21, 2023

(54) ULTRA-LIGHT NANOTECHNOLOGY BREATHABLE GOWNS AND METHOD OF MAKING SAME

(71) Applicants: SingFatt Chin, Pleasanton, CA (US); DaYoung Kim, Daegu (KR)

(72) Inventors: SingFatt Chin, Pleasanton, CA (US); DaYoung Kim, Daegu (KR)

(73) Assignee: TOP SOLUTIONS CO LTD

( * ) Notice: Subject to any disclaimer, the term of this patent is extended or adjusted under 35 U.S.C. 154(b) by 0 days.

(21) Appl. No.: 17/481,144

(22) Filed: Sep. 21, 2021

Related U.S. Application Data (60) Provisional application No. 63/203,627, filed on Jul. 27, 2021.

(51) Int. Cl.
  *B32B 37/06* (2006.01)
  *B32B 5/26* (2006.01)
  (Continued)

(52) U.S. Cl.
  CPC ....... *A41D 13/1209* (2013.01); *A41D 31/145* (2019.02); *B32B 5/269* (2021.05);
  (Continued)

(58) Field of Classification Search
  CPC .............. A41D 13/1209; A41D 31/145; A41D 2500/30; B32B 5/269; B32B 37/06;
  (Continued)

(56) References Cited

U.S. PATENT DOCUMENTS

| 4,536,361 A | 8/1985 | Torobin |
| 4,795,668 A | 1/1989 | Krueger |

(Continued)

FOREIGN PATENT DOCUMENTS

| KR | 20090111230 A | * 10/2009 |
| WO | 1995016562 A1 | 6/1995 |
| WO | 1996019346 A | 6/1996 |

OTHER PUBLICATIONS

KR20090111230A Machine Translation of Description (EPO/Google) (Year: 2022).*

(Continued)

*Primary Examiner* — Cynthia L Schaller
(74) *Attorney, Agent, or Firm* — Top Solutions IP (57) ABSTRACT

A protective garment is constructed with a fibrous material. The fibrous material comprises a first nonwoven layer, a second nonwoven layer, and a nanofiber layer laminated between the first nonwoven layer and the second nonwoven layer. The fibrous material has a mean flow pore size greater than or equal to about 0.02 micron and less than or equal to about 0.5 microns, and a water vapor transmission rate greater than or equal to about 10000 g/m²/day and less than or equal to about 100000 g/m²/day. In a method of making a fibrous layer, a first nonwoven layer and a nanofiber layer are provided. A polyurethane reactive resin is applied to the first nonwoven layer in an amount of 2 to 30 g/m². The nanofiber layer is then laminated to the first nonwoven layer applied with the polyurethane reactive resin and pressed to form the fibrous layer.

20 Claims, 6 Drawing Sheets

(51) Int. Cl.
    B32B 38/18      (2006.01)
    B32B 37/12      (2006.01)
    B32B 7/12       (2006.01)
    A41D 13/12      (2006.01)
    A41D 31/14      (2019.01)
    D04H 3/005      (2012.01)
    D04H 3/16       (2006.01)
    B32B 38/16      (2006.01)

(52) U.S. Cl.
    CPC .......... *B32B 37/06* (2013.01); *B32B 38/1825*
        (2013.01); *D04H 3/005* (2013.01); *D04H 3/16*
        (2013.01); *A41D 2500/30* (2013.01); *B32B
        7/12* (2013.01); *B32B 2037/1261* (2013.01);
        *B32B 2038/168* (2013.01); *B32B 2305/20*
        (2013.01); *B32B 2307/724* (2013.01); *B32B
        2309/02* (2013.01); *B32B 2309/025* (2013.01);
        *B32B 2309/12* (2013.01); *D10B 2321/022*
        (2013.01); *D10B 2331/02* (2013.01); *D10B
        2501/04* (2013.01); *D10B 2509/00* (2013.01)

(58) Field of Classification Search
    CPC .................. B32B 38/1825; B32B 7/12; B32B
        2037/1261; B32B 2038/168; B32B
        2305/20; B32B 2307/724; B32B 2309/02;
        B32B 2309/025; B32B 2309/12; D04H
        3/005; D04H 3/16; D10B 2321/022;
        D10B 2331/02; D10B 2501/04; D10B
        2509/00
    See application file for complete search history.

(56)            References Cited

U.S. PATENT DOCUMENTS

| | | |
|---|---|---|
| 4,828,556 A | 5/1989 | Braun |
| 5,057,368 A | 10/1991 | Largman |
| 5,069,970 A | 12/1991 | Largman |
| 5,102,711 A | 4/1992 | Keller |
| 5,108,820 A | 4/1992 | Kaneko |
| 5,114,631 A | 5/1992 | Nyssen |
| 5,183,670 A | 2/1993 | Trudeau |
| 5,260,003 A | 11/1993 | Nyssen |
| 5,277,976 A | 1/1994 | Hogle |
| 5,336,552 A | 8/1994 | Strack |
| 5,382,400 A | 1/1995 | Pike |
| 5,466,410 A | 11/1995 | Hills |
| 5,520,980 A | 5/1996 | Morgan |
| 5,534,335 A | 7/1996 | Everhart |
| 5,591,510 A | 1/1997 | Junker |
| 5,673,433 A | 10/1997 | Rothrum |
| 5,679,379 A | 10/1997 | Fabbricante |
| 5,688,157 A | 11/1997 | Bradley |
| 5,804,512 A | 9/1998 | Lickfield |
| 5,865,926 A | 2/1999 | Wu |
| 5,935,370 A | 8/1999 | Weimer |
| 5,935,883 A | 8/1999 | Pike |
| 6,103,647 A | 8/2000 | Shultz |
| 6,110,588 A | 8/2000 | Perez |
| 6,114,017 A | 9/2000 | Fabbricante |
| 6,117,800 A | 9/2000 | Seibert |
| 6,238,767 B1 | 5/2001 | McCormack |
| 6,315,306 B1 | 11/2001 | Torobin |
| 6,382,526 B1 | 5/2002 | Reneker |
| 6,520,425 B1 | 2/2003 | Reneker |
| 6,929,853 B2 | 8/2005 | Forte |
| 8,658,548 B2 | 2/2014 | Bryner |
| 8,765,255 B2 | 7/2014 | Conley |
| 9,464,369 B2 | 10/2016 | Isele |
| 9,718,012 B2 | 8/2017 | Chung et al. |
| 9,827,696 B2 | 11/2017 | Afshari |
| 10,512,289 B2 | 12/2019 | Jascomb |
| 10,633,271 B2 | 4/2020 | Ji |
| 2004/0116025 A1 | 6/2004 | Gogins et al. |
| 2005/0079379 A1 | 4/2005 | Wadsworth et al. |
| 2008/0216205 A1 | 9/2008 | Conley et al. |
| 2009/0186548 A1* | 7/2009 | Rock .................. A41D 31/145 156/244.11 |
| 2011/0030885 A1* | 2/2011 | Anneaux ............. D01D 5/0076 156/187 |
| 2015/0147573 A1 | 5/2015 | Zhang et al. |
| 2016/0184080 A1* | 6/2016 | Blum .................... A61L 31/04 623/1.13 |
| 2016/0369511 A1* | 12/2016 | Sandhar ................. B32B 37/15 |

OTHER PUBLICATIONS

Innovation Q Search History (ip.com) performed Apr. 20, 2022 (Year: 2022).*
PCT, International Search Report and Written Opinion of the International Searching Authority in PCT/US21/51353, dated Feb. 14, 2022, 11 pages.
Wadsworth et al., "Development of Highly breathable and Effective Blood/Viral Barrier Laminates of Microporous Films, Staple Fibers and Nonwovens," J. of Coated Fabrics, vol. 28, Jul. 1998, 17 pages.

* cited by examiner

ULTRA-LIGHT NANOTECHNOLOGY BREATHABLE GOWNS AND METHOD OF MAKING SAME

CROSS-REFERENCE TO RELATED APPLICATIONS

This application claims priority under 35 U.S.C. § 119 to U.S. provisional patent application No. 63/203,627 filed Jul. 27, 2021, the disclosure of which is hereby incorporated by reference in its entirety.

TECHNICAL FIELD

This application relates generally to protective clothing materials. In particular, various embodiments of surgical gowns or protective garments are described. The surgical gowns or protective garments are highly breathable and can prevent penetration by certain fluids and microbes.

BACKGROUND

Surgical gowns have been used by health care providers to ensure that patients do not contract any infection while receiving quality care in a hospital or a surgery center. The possibility of health care providers becoming infected with human immunodeficiency (HIV), hepatitis B viruses (HBV), severe acute respiratory syndrome (SARS) virus, more recently the coronavirus (COVID 19), and the threat of pathogens being spread by biological warfare and terrorism, have resulted in much increased concern for the safety of health care providers or emergency responders. According to the Occupational Safety and Health Administration (OSHA), more than 5.6 million health care and public safety workers are at potential risk of being exposed to HIV and HBV alone. This risk led OSHA to recognize the critical nature of blood borne pathogens and to issue a mandate on personal protective equipment (PPE) with the long-term goal of reducing the risk of occupational exposure to blood borne diseases. PPE is defined by OSHA as "specialized clothing or equipment worn by an employee for protection against a hazard." Gowns, aprons, drapes, and masks are included in this designation. PPE is considered to be "appropriate" only if it does not permit blood or other possibly infectious materials to pass to or reach employee's clothes, street clothes, undergarments, skin, eyes, mouth, or other mucous membranes under normal conditions of use and during the time in which the protective equipment will be used (*CFR Part 1910.1030 Occupational Exposure to Bloodborne Pathogens: Final Rule, Federal Register*, Dec. 6, 1991). Extent and time exposure and other conditions during usage are criteria used in determining the efficacy of PPE for a certain task.

Healthcare workers are at risk of exposure to pathogenic microbes via contact with bodily fluids such as blood, urine, saliva, sweat, feces, vomit, breast milk, semen, or other carriers such as lint, sloughed skin or other viruses such as coronavirus. The use of protective clothing such as surgical gowns, surgical hoods, isolation gowns, and coveralls that act as a barrier to bodily fluids and other carriers can eliminate or reduce exposure, and therefore prevent the transfer of pathogenic microbes between, e.g., patients and healthcare workers. The use of defective or inappropriate protective clothing may result in unintended penetration of a carrier through the clothing (e.g., strikethrough) and the subsequent ability for microbes present in the carrier to directly contact the wearer. Depending on the application, protective clothing may be designed to offer different levels of protection from carriers and microbes.

Protective garments or clothing, such as surgical gowns, are generally worn in environments such as hospitals, health-care facilities, food processing plants, accident sites, hazardous waste sites, homes or anywhere a person may encounter pathogens, chemicals, dusts, blood, water, smoke, or irritants. These garments are exposed to a variety of hazards, and as a result, typically require sufficient strength to resist contaminants, water, tears, and puncture, and yet achieve the breathability for wearer's comfort.

Materials used to manufacture protective garments or clothing are often designed to act as a barrier to liquids thereby providing protection from blood, water, industrial chemicals, pathogens, irritants and the like. In this regard, some fabrics or layers can act as a barrier to liquids while at the same time remaining "breathable" in the sense that water vapor may pass through the fibrous layers from inside. Breathable materials are often desired in many products such as for healthcare workers because breathable clothing helps prevent the build-up of moisture next to the worker's body, and thus, is generally more comfortable to wear than non-breathable clothing.

However, as the level of breathability increases the strength and the protection of the barrier layer typically decreases. Moreover, breathable barrier layers are often materials that have little inherent strength. They tend to be very fragile or easily damaged by abrasion, stretching and/or tearing forces. Additionally, breathable barrier layers are often heat sensitive and are difficult to thermally bond to other higher-strength materials. Adhesives may be used to join breathable barrier layers with other materials. Unfortunately, adhesives tend to be expensive, may reduce breathability, lose adhesion when exposed to certain solvents or environments, and require heat curing that may thermally damage sensitive films. Thus, many breathable fabrics fail to provide sufficient barrier properties and are prone to leak when subjected to intense wear, abrasion, stretching or other harsh conditions.

Accordingly, there is a general need for improved protective garments or surgical gowns. It would be desirable to provide a protective garment or surgical gown that can prevent penetration by fluids such as microbes while being highly permeable to moisture vapor. It would be highly desirable to provide an ultra-light breathable protective garment or surgical gown with improved mechanical properties such as enhanced tensile strength and tear resistance.

SUMMARY

In one aspect, embodiments of the disclosure feature a protective garment. In general, an embodiment of the protective garment comprises a fibrous material. The fibrous material comprises a first nonwoven layer, a second nonwoven layer, and a nanofiber layer laminated between the first nonwoven layer and the second nonwoven layer. The fibrous material has a mean flow pore size greater than or equal to about 0.02 micron and less than or equal to about 0.5 microns, and breathability or water vapor transmission rate (WVTR) greater than or equal to about 10,000 gram/m²/day and less than or equal to about 100,000 gram/m²/day.

In various embodiments of the aspect, the first nonwoven layer may comprise a spunbond-meltblown-spunbond (SMS) nonwoven layer, and the second nonwoven layer may comprise a spunbond-spunbond (SS) nonwoven layer, and the nanofiber layer may comprise electrospun layer. The SMS layer may comprise polypropylene or polyester. The SS layer may comprise polypropylene or polyester. The nanofiber layer may comprise polyurethane or expanded polytetrafluoroethylene (ePTFE).

In various embodiments of the aspect, the air permeability of the fibrous material is greater than or equal to 1 CFM and less than or equal to 10 CFM. The fibrous material has a water vapor transmission rate (WVTR) of greater than or equal to 10,000 gram/m$^2$/day. The fibrous material has a thickness ranging from 0.01 mm to 0.3 mm. The fibrous material has a basis weight between 10 g/m$^2$ to 60 g/m$^2$. The nanofiber layer has a basis weight between 2 g/m$^2$ to 8 g/m$^2$.

In another aspect, embodiments of the disclosure feature a breathable fabric. In general, an embodiment of the breathable fabric comprises a fibrous material. The fibrous material has a mean flow pore size greater than or equal to about 0.02 micron and less than or equal to about 0.5 microns, and an air permeability greater than or equal to about 1 CFM and less than or equal to about 10 CFM.

In a further aspect, embodiments of the disclosure feature a method of making a fibrous layer. In general, an embodiment of the method comprises the following steps. A first nonwoven layer and a nanofiber layer are provided. A polyurethane reactive resin is applied to the first nonwoven layer in an amount of 2 to 30 g/m$^2$. The nanofiber layer is then laminated to the first nonwoven layer applied with the polyurethane reactive resin and pressed to form the fibrous layer.

In various embodiments of the aspect, the polyurethane reactive resin may comprise moisture curable 100% solids polyurethane. The polyurethane reactive resin may be heated at a temperature of 50° C. to 70° C. and applied to the first nonwoven layer. The nanofiber layer and the first nonwoven layer may be pressed using driving rollers heated at a temperature of 80° C. to 120° C. The pressing may be carried out under a pressure of about 5 bar. The fibrous layer may be cured at a temperature of 25° C. to 35° C. and a relative humidity of 65% to 80% for 24 to 48 hours, and then wound.

In various embodiments of the aspect, the method may further comprise the step of providing a second nonwoven layer, applying a polyurethane reactive resin in an amount of 2 to 30 g/m$^2$ to the second nonwoven layer, and laminating the second nonwoven layer with the nanofiber layer-first nonwoven layer laminate and pressing.

In various embodiments of the aspect, the polyurethane reactive resin may comprise moisture curable 30% to 80% solids polyurethane in a solvent, and the method may further comprise removing the solvent after the applying step by volatilizing at a temperature of 40° C. to 120° C.

In one embodiment, a protective clothing material comprises a fibrous material, which comprises a spunbond-meltblown-spunbond (SMS) layer, a nanofiber layer, and a spunbond-spunbond (SS) layer. These layers are laminated in one monolithic piece forming a fibrous layer. The maximum pore size of the fibrous layer is less than or equal to 0.5 micron (500 nanometers (nm)). The minimum flow pore size of the fibrous layer is more than or equal to about 0.02 micron (20 nanometers (nm)). The air permeability of the fibrous layer is greater than or equal to about 1 CFM and less than or equal to about 10 CFM. The breathability or water vapor transmission rate (WVTR) greater than or equal to about 10,000 gram/m$^2$/day and less than or equal to about 100,000 gram/m$^2$/day.

In another embodiment, a protective clothing material comprises a fibrous material, which comprises three layers laminated into a monolithic piece: an outer or first spunbond-meltblown-meltblown-spunbond (SMMS) layer, a middle or second nanofiber layer, and an inner or third spunbond-spunbond (SS) layer. The first spunbond-meltblown-meltblown-spunbond layer has a basis weight of greater than or equal to 10 gram/m$^2$ and less than or equal to 40 gram/m$^2$. The second nanofiber layer has a basis weight of greater than or equal to 2 gram/m$^2$ and less than or equal to 10 gram/m$^2$. The third layer spunbond-spunbond material has a basis weight of greater than or equal to 10 gram/m$^2$ and less than or equal to 40 gram/m$^2$. The air permeability of the fibrous material is greater than or equal to about 1 CFM and less than or equal to about 10 CFM. The breathability or water vapor transmission rate (WVTR) greater than or equal to about 10,000 gram/m$^2$/day and less than or equal to about 100,000 gram/m$^2$/day.

In a further embodiment, a protective clothing material comprises a fibrous material, which comprises three layers laminated into a monolithic piece: an outer or first spunbond-meltblown-spunbond (SMS) layer, a middle or second nanofiber layer, and an inner or third spunbond-spunbond (SS) layer. The first spunbond-meltblown-spunbond layer has a basis weight of greater than or equal to 10 gram/m$^2$ and less than or equal to 40 gram/m$^2$. The second nanofiber layer has a basis weight of greater than or equal to 2 gram/m$^2$ and less than or equal to 10 gram/m$^2$. The third spunbond-spunbond layer has a basis weight of greater than or equal to 10 gram/m$^2$ and less than or equal to 40 gram/m$^2$. The air permeability of the fibrous material is greater than or equal to about 1 CFM and less than or equal to about 10 CFM. The breathability or water vapor transmission rate (WVTR) greater than or equal to about 10,000 gram/m$^2$/day and less than or equal to about 100,000 gram/m$^2$/day.

In a further embodiment, a protective clothing material comprises a fibrous material, which comprises three layers laminated into a monolithic piece: an outer or first spunbond-spunbond (SS) layer, a middle or second nanofiber layer, and an inner or third spunbond-spunbond (SS) layer. The first spunbond-spunbond layer has a basis weight of greater than or equal to 10 gram/m$^2$ and less than or equal to 40 gram/m$^2$. The second nanofiber layer has a basis weight of greater than or equal to 2 gram/m$^2$ and less than or equal to 10 gram/m$^2$. The third spunbond-spunbond layer has a basis weight of greater than or equal to 10 gram/m$^2$ and less than or equal to 40 gram/m$^2$. The air permeability of the fibrous material is greater than or equal to about 1 CFM and less than or equal to about 10 CFM. The breathability or water vapor transmission rate (WVTR) greater than or equal to about 10,000 gram/m$^2$/day and less than or equal to about 100,000 gram/m$^2$/day.

This Summary is provided to introduce selected aspects and embodiments of this disclosure in a simplified form and is not intended to identify key features or essential characteristics of the claimed subject matter, nor is it intended to be used as an aid in determining the scope of the claimed subject matter. The selected aspects and embodiments are presented merely to provide the reader with a brief summary of certain forms the invention might take and are not intended to limit the scope of the invention. Other aspects and embodiments of the disclosure are described in the section of Detailed Description.

These and various other aspects, embodiments, features, and advantages of the disclosure will become better understood upon reading of the following detailed description in conjunction with the accompanying drawings.

DETAILED DESCRIPTION

Definitions

As used herein, the term "liquid impermeable" or "water repellent" refers to a property of a material that does not allow a liquid, such as water or blood, to readily pass therethrough. Such a material has a minimum hydrostatic head value of at least about 30 mbar. Hydrostatic head value or hydrohead value refers to a measurement of liquid barrier properties of a fabric. Hydrostatic head value is measured using a hydrostatic pressure test that determines the resistance of nonwoven materials to penetration by water under low hydrostatic pressure. Generally speaking, the test procedure is in accordance with AATCC 42—Test Method For Water Resistance: Impact Penetration, and AATCC 127—Test Method For Water Resistance: Hydrostatic Pressure. A fabric with a higher hydrostatic head reading indicates it has a greater resistance to liquid penetration than a fabric with a lower hydrostatic head. Fabrics having a greater resistance to liquid penetration are generally thought to also have useful levels of resistance to penetration by particulates such as blood, bacteria, viruses, dusts and powders or the like.

As used herein, the term "breathable" or "breathability" refers to a property of a material which is permeable to water vapor having a minimum moisture vapor transmission rate ("MVTR") of at least about 100 gram/$m^2$ per day (g/$m^2$/day). The MVTR of a fabric is also often generally referred to as the water vapor transmission rate ("VWTR"). Generally speaking, materials used in protective garments such as healthcare professionals will desirably have a MVTR of greater than 1000 g/$m^2$/day. For example, useful fabrics will have a MVTR ranging from about 2000 to about 6000 g/$m^2$/day. Some fabrics may have MVTR values ranging as high as about 10000 to 100000 g/$m^2$/day. Even greater MVTR values are desirable if it does not compromise the water repellent barrier properties of the fabric.

As used herein, the term "cubic feet per minute" per square meter ("CFM") refers to a measurement of the wind resistance or air permeability of a fabric. The higher the CFM, the greater the volume of air passing through.

Figure 8:
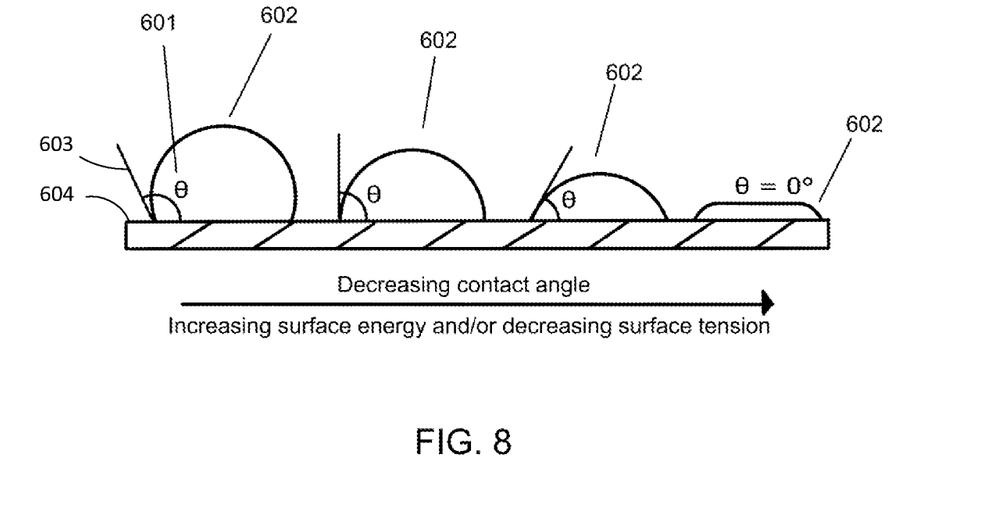
FIG. 8 is a schematic illustrating surface energy and hydrophobicity correlation.

As used herein, the term "hydrophobic" refers to a property of a material that is water impermeable or water repelling. For example, a hydrophobic surface is a water repelling surface, that resists wetting and possesses low surface energy surface. A material will be classified as hydrophobic if its moisture contact angle ($\Theta$) of the droplet equal to or greater than 90 degrees, as illustrated in FIG. 8.

As used herein, the term "surface energy" is a relative measurement of the energy at the surface of a material. A surface generally tends to minimize its energy. This can be done by adsorbing a material with lower energy onto its surface. Although numerically equivalent to liquid surface tension, surface energy is mostly used to describe a solid. The tendency of a solution to spread out or "wet" on a solid surface depends on several factors. Generally, a surface with a low surface energy (hydrophobic) will cause poor wetting, and therefore result in a high contact angle $\Theta$ (601) of the water droplets (602), as illustrated in FIG. 8. This is because the surface is not capable of forming strong bonds, so there is little energetic reward for the liquid to break bulk bonding in favor of interacting with the surface. Typical surfaces with low surface energy include quality surgical gowns to minimize wetting. The opposite is true for a high surface energy, which will generally cause good wetting and a low contact angle $\Theta$ of the water droplets, as illustrated in FIG. 8. Examples of surfaces with high surface energy include glasses, contact lenses, ceramics, metals, and materials held together by stronger bonds such as ionic, covalent and metallic bonds.

As used herein, the term "electrospinning" refers to a process used to make specialized fabrics, such as those in spacesuits and surgical gowns. Ultrathin, multifilament fibers with diameters in the nanometer range can be made by spinning and manipulating streams of electrically charged polymers in a strong magnetic or electric field.

As used herein, the term "nonwoven layer" or "nonwoven web" refers to a layer having a structure of individual fibers that are interlaid forming a matrix, but not in an identifiable repeating manner. Nonwoven layers have been, in the past, formed by a variety of processes known to those skilled in the art such as, for example, meltblowing, spunbonding, wet-forming, and various bonded carded layer processes.

As used herein, the term "spunbond layer" or "spunbond web" refers to a layer formed by extruding a molten thermoplastic material as filaments from a plurality of fine, usually circular, capillaries with the diameter of the extruded filaments then being rapidly reduced, for example, by fluid-drawing or other well-known spunbonding mechanisms.

As used herein, the term "meltblown layer" or "meltblown web" refers to a layer having fibers formed by extruding a molten thermoplastic material through a plurality of fine, usually circular, capillaries as molten fibers into a high-velocity gas (e.g., air) stream which attenuates the fibers of molten thermoplastic material to reduce their diameters. Thereafter, the meltblown fibers are carried by the high-velocity gas stream and are deposited on a collecting surface to form a web of randomly disbursed fibers.

Figure 1:
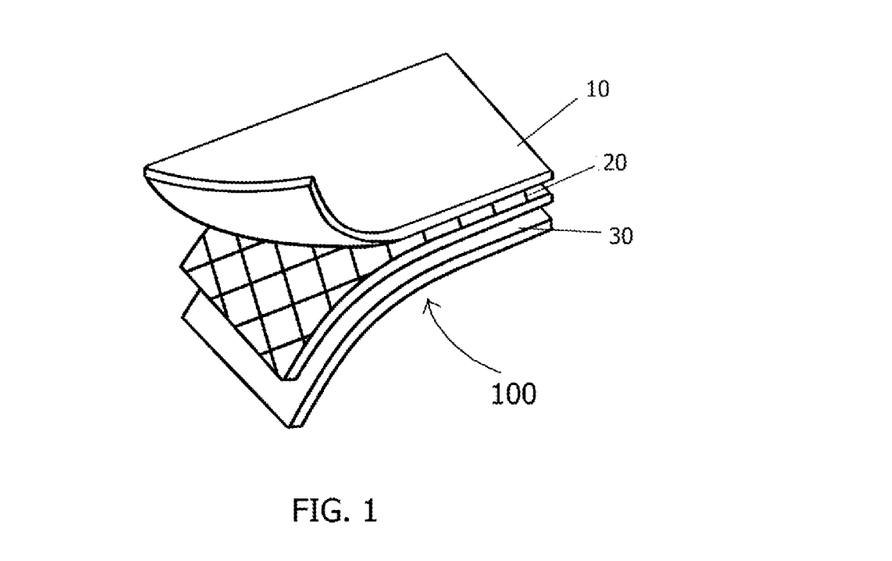
FIG. 1 is a schematic showing a protective clothing material comprising nonwoven layers according to embodiments of the disclosure.
Figure 2:
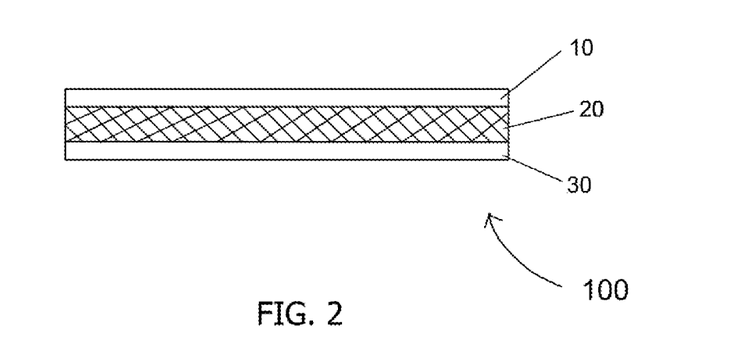
FIG. 2 is a cross-sectional view of a protective clothing material comprising laminated nonwoven layers according to embodiments of the disclosure.
Figure 6:
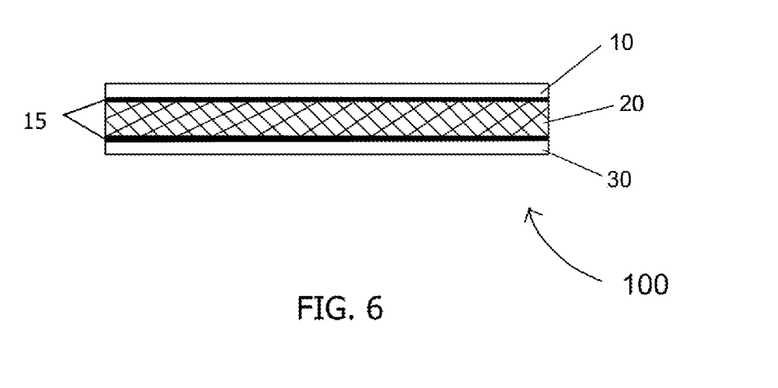
FIG. 6 is a cross-sectional view of a protective clothing material comprising laminated nonwoven layers according to embodiments of the disclosure.

As used herein, the term "fibrous layer" refers to multi-layer fibers or multi-component fibers that are formed from at least two fibers or at least two polymers, as shown in FIGS. 1, 2, and 6. The multi-layer fibers or multi-component fibers may be laminated or joined together to form one monolithic fibrous layer using a novel manufacturing process illustrated in FIGS. 7A-7B, to be described in greater detail below, forming a liquid impermeable fabric with high degree of breathability.

As used herein, the term "fiber" refers to a fundamental solid form, usually semi-crystalline, characterized by relatively high tenacity and an extremely high ratio of length to diameter, such as several hundred to one. Exemplary natural fibers include wool, silk, cotton, and hemp. Exemplary semi-synthetic fibers include rayon. Exemplary synthetic fibers include spinneret extruded polyamides, polyesters, polyurethane, acrylics, and polyolefins.

As used herein, the term "polymer" refers to a macromolecule formed by the chemical union of 5 or more identical combining units called monomers. Generally, polymers include homopolymers, copolymers, such as for example, block, graft, random and alternating copolymers, terpolymers, etc., and blends and modifications thereof. Furthermore, the term "polymer" shall include all possible geometrical or spatial configurations of the molecule. These configurations include isotactic, syndiotactic and atactic symmetries.

As used herein, the term "lamination" or "laminating process" refers to a process of making a composite material of multiple layers, at least one of which is textile fabric bonded closely by an adhesive or by the adhesive properties of one or more of the component layers. Solvent coating and hot melt coating machines may be used. Lamination may involve one or more methods: thermal lamination (melting an existing component), adhesive lamination (adding a liquid component just prior to laminating), ultrasonic lamination (a vibration process which softens or melts components, similar to thermal lamination), etc.

As used herein, the term "100% solids polyurethane reactive resin or polyurethane adhesive" refers to polyurethane raw materials for 100% solids adhesives and sealants. Adhesive formulations with 100 percent solids can be desirable in a variety of applications for lamination. One example of such polyurethane resin is manufacture by Covestro AG of Germany.

As used herein, the term "delamination" refers to separation of the plies of a laminated fabric due to a failure of the bonding mechanism.

As used herein, the term "bond strength" refers to the average peel force required to separate the component layers of a specimen under specified conditions.

As used herein, the term "surgical apparel" refers to medical devices that are intended to be worn by operating room personnel during surgical procedures to protect both the surgical patient and the operating room personnel from transfer of microorganisms, body fluids, and particulate material. Examples include surgical caps, hoods, masks, gowns, operating room shoes and shoe covers, and isolation masks and gowns. A protective garment includes but is not limited to surgical apparel.

As used herein, the term "g/m$^2$" or "gram/m$^2$" or "gram/square meter" or "GSM" refers to the weight of a fabric in grams in one meter by one meter square. It is a benchmark specification to meet production manufacturing requirements. It is also a standard upon which different materials are compared.

As used herein, the term "SMS" refers to Spunbond-Meltblown-Spunbond process.

As used herein, the term "SMMS" refers to Spunbond-Meltblown-Meltblown-Spunbond process.

As used herein, the term "SS" refers to Spunbond-Spunbond process.

Fibrous Materials and Protective Garments

In general, a protective clothing material or a protective garment of the disclosure comprises a fibrous layer that can serve as a barrier impermeable to certain fluids such as bodily fluids, water, and microbes such as bacteria, fungi, viruses. The barrier properties of the fibrous layer may be due, at least in part, to the structural uniformity such as the pore size uniformity, air permeability uniformity, suitable basis weight, and/or relatively small pore size (mean flow pore size or maximum pore size) of the fibrous layer. The fibrous layer may have a relatively high air permeability that imparts beneficial properties such as relatively high air flow or breathability to the protective clothing material without adversely affecting its protection rating such as ANSI/AAMI level 4 according to ASTM F1671. The protective clothing material may comprise one or more nonwoven layers such as spunbond-meltblown-spunbond (SMS) layers that impart beneficial properties such as splash resistance to the protective clothing material. The protective clothing material of the disclosure is useful for a wide variety of applications, including formation of ANSI/AAMI level 4 (ASTM F1671 highest protection level) protective garments such as surgical apparel, surgical drapes, surgical gowns, isolation gowns, surgical hoods, etc.

Many clinical environments require healthcare workers to wear protective clothing that meets certain protection level standards. For example, during surgical operations, healthcare workers need to wear ANSI and/or AAMI level 4 protective clothing. In conventional protective clothing, a tradeoff exists between protection rating e.g., level 4 and features important to wearability or comfort such as weight, breathability, and good air permeability. For instance, some existing protective clothing utilizes a thin polymer film to form lightweight level 4 protective clothing. However, the thin polymer film can significantly reduce air permeability and/or breathability e.g., moisture vapor transmission rate. During long surgical operations which may last e.g., 2-12 hours, the low exchange of heat and/or sweat due to low air permeability and/or breathability can adversely affect the surgeon's performance.

According to embodiments of the disclosure, a fibrous layer, having a relatively low pore size (mean flow pore size and/or maximum pore size), suitable basis weight, and/or high structural uniformity, is used as a protective clothing material to meet the requisite protection rating and provide good wearability or comfort. The protective clothing comprising such fibrous layer of the disclosure does not suffer from one or more limitations of the conventional protective clothing. Without being bound by any theory, it is believed that the relatively small pore size of the fibrous layer of the disclosure serves to reduce or eliminate the transmission of fluids such as bodily fluids and microbes. It is also believed that the structural uniformity e.g., in pore size and air permeability allows the fibrous layer of the disclosure to have relatively uniform resistance to transmission throughout the layer, and thus the protective clothing. Structural non-uniformity, such as a relatively large variance in pore size or air permeability, may result in non-uniformity in the resistance to transmission throughout the layer and ultimately allow bodily fluids and/or microbes to penetrate at areas of low resistance. It is also believed that the suitable basis weight allows the fibrous layer of the disclosure to have a sufficient fiber density to form a tortuous path that traps fluids and/or microbes while maintaining features important to wearability such as light weight and breathability.

FIGS. 1-2 illustrate an example of a protective clothing material or a fibrous layer 100 according to embodiments of the disclosure. As shown, the fibrous layer or material 100 may include a first nonwoven layer 10, a second nonwoven layer 30, and a nanofiber layer 20 laminated or bonded between the first nonwoven layer 10 and the second nonwoven layer 30. The nanofiber layer 20 can also be a nonwoven layer. The first nonwoven layer 10 may be directly laminated or bonded to the nanofiber layer 20, which can be directly laminated or bonded to the second nonwoven layer 30. Alternatively, one or more intervening nonwoven layers may be positioned between the first nonwoven layer 10 and the nanofiber layer 20 and/or between the second nonwoven layer 30 and the nanofiber layer 20. The fibrous layer 100 may be a continuous monolithic fibrous layer. Alternatively, the fibrous layer 100 may be a non-continuous. The one or more nonwoven layers 10, 20, and 30 may be a continuous fiber formed by a suitable process respectively, such as meltblowing, electrospinning, spunbonding, or any combination thereof. For example, the first nonwoven layer 10 may be a spunbond-meltblown-spunbond (SMS) fiber layer, or a spunbond-spunbond (SS) layer, or other suitable nonwoven layers. The second nonwoven layer 30 may be an SMS nonwoven layer, an SS nonwoven layer, or other suitable nonwoven layer. The nanofiber layer 20 may be electrospunbond layer. Any intervening nonwoven layers may be meltblown layers, spunbond layers, electrospunbond layers, or any combination thereof. By way of example, the fibrous layer 100 may include a first SMS nonwoven layer 10, a second SS nonwoven layer 30, and a nanofiber layer 20 laminated between the first SMS nonwoven layer 10 and the second SS nonwoven layer 30. Any other combinations of the nonwoven layers are possible and contemplated by the inventors. The nonwoven layers 10, 20, and 30 may be laminated or bonded together using the method of the disclosure, to be described further below in conjunction with FIGS. 7A-7B.

In some embodiments, the first nonwoven layer 10, the nanofiber layer 20, and the second nonwoven layer 30 may be joined via a laminating process, to be described below in conjunction with FIGS. 7A-7B, to form a monolithic fibrous layer 100 having beneficial properties. For example, in some embodiments, the fibrous layer 100 may have a relatively small mean flow pore size e.g., greater than or equal to about 0.02 microns, and/or a maximum pore size e.g., less than or equal to about 0.5 microns. The monolithic fibrous layer 100 may also have a suitable basis weight e.g., greater than or equal to about 10 g/m² and less than or equal to about 60 g/m². In some embodiments, the fibrous layer 100 may be relatively lightweight, breathable, and/or permeable to air. For instance, the fibrous layer 100 may have a relatively high air permeability e.g., greater than or equal to about 0.5 CFM and less than or equal to about 10 CFM, and/or a relatively high moisture vapor transmission rate e.g., greater than or equal to 10,000 g/m²/day according to ASTM D6701 standard. In certain embodiments, the fibrous layer 100 may be relatively thin e.g., greater than or equal to about 0.01 millimeter and less than or equal to about 0.3 millimeter.

In some embodiments, fibrous layer 100 may be relatively structurally uniform, such that the variance in one or more structural properties when measured across the fibrous layer is relatively small. For instance, in some embodiments, the standard deviation in mean flow pore size when measured across the fibrous layer 100 may be less than 0.35 micron. The difference between the maximum pore size and the mean flow pore size may be relatively small e.g., greater than or equal to about 0.02 microns and less than or equal to about 1 micron. In certain embodiments, the standard deviation in air permeability when measured across the fibrous layer may be less than 0.5 CFM.

Figure 5:
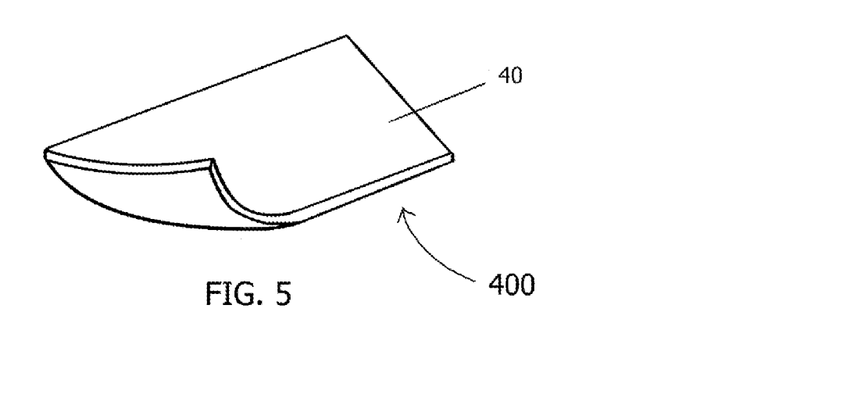
FIG. 5 is a schematic showing a single layer of a protective clothing material according to embodiments of the disclosure.

With reference to FIGS. 1-2, the fibrous layer 100 may comprise any suitable number of nonwoven layers e.g., one nonwoven layer, two nonwoven layers, three nonwoven layers, four nonwoven layers, five nonwoven layers, six or more nonwoven layers. FIG. 5 shows an example of a fibrous layer 400 comprising a single nonwoven layer 40. The single nonwoven layer 40 may be a meltblown nonwoven layer, a spunbond-meltblown-spunbond nonwoven layer, or a nanofiber layer incorporated within nonwoven layers. Regardless of the number of nonwoven layers, the fibrous layer 100 may have the properties described herein.

With reference to FIGS. 1-2, the one or more nonwoven layers 10, 30 and the nanofiber layer 20 can impart beneficial properties to the fibrous layer 100, such as moisture permeability and water resistance. Moisture permeable or breathable fabrics are desirable for healthcare worker's comfort. On the other hand, resistance to water droplets and microbes is important for ASTM level 4 protection in medical applications. The fibrous layer 100 including laminated nonwoven layers 10, 20, 30 exhibits excellent permeability to water vapor and resistance to water droplets and microbes. The porous structure of the electrospun nanofiber layer 20 provides good moisture transmission capability. As will be described in greater detailed below in conjunction with FIGS. 7A-7B, the method of the disclosure including the heated laminating process and other conditions enhances the moisture permeability and increase water resistance of the fibrous layer 100 simultaneously.

In some embodiments, the protective clothing material or fibrous layer 100 may include one or more nonwoven layers including at least a portion e.g., a surface and/or interior that repels a fluid such as hydrophilic fluid, aqueous fluid, bodily fluid, blood. In such cases, the nonwoven layer or layers may substantially block the transport of droplets of the fluid across the protective clothing material. For example, the nonwoven layer or layers may repel fluid droplets e.g., aqueous fluids, bodily fluids, hydrophilic fluids, blood. As another example, a nonwoven layer e.g., layer 10 may repel droplets of a certain size and the fibrous layer 100 may repel fluid droplets that cannot be repelled and/or removed by a single nonwoven layer e.g., the nonwoven layer 10 on its own. For instance, the fibrous layer 100 may be designed to repel smaller droplets that bypass the coarse fibrous layer. In certain embodiments, the protective clothing material 100 includes one or more nonwoven layers or layers that have a portion e.g., surface and/or interior that repels a hydrophilic fluid e.g., aqueous fluid, bodily fluid, blood. In such embodiments, at least a portion of the nonwoven layer or layers may be hydrophobic. For instance, both the nonwoven layers 10 and 30 may comprise fibers formed from a hydrophobic material e.g., polypropylene, and/or, may be modified with a hydrophobic material.

With reference still to FIGS. 1-2, any of the nonwoven layers 10, 30 and nanofiber layer 20 of the protective clothing material 100 may be a modified nonwoven layer or layers. In some embodiments, a single nonwoven layer is modified. In some embodiments, each of the nonwoven layers in the protective clothing material may be modified. In some embodiments, less than or equal to two nonwoven layers in a protective clothing material may be modified. In some embodiments, the protective clothing material 100 does not comprise a modified nonwoven layer.

In some embodiments, at least a portion of a nonwoven layer or layers may be modified with a material. In certain embodiments, only a single surface of a nonwoven layer is modified with a material. In some instances, opposing surfaces of a nonwoven layer are modified with a material. In some embodiments, only the interior of a nonwoven layer is modified with a material. In some embodiments, the entire nonwoven layer may be modified with a material. In general, a modified nonwoven layer comprises a material on at least a portion of the fibers e.g., on the surface and/or in the interior. In some cases, the material may form a coating on at least a portion of the fibers e.g., at the surface and/or in the interior of the layer or nonwoven layer.

In some embodiments, one or more nonwoven layers in the protective clothing material 100 may be designed to be discrete from another nonwoven layer or layers. That is, the fibers from one nonwoven layer or layers do not intermingle, or substantially intermingle with fibers from another nonwoven layer or layers. For example, in some embodiments, fibers from the first nonwoven layer 10 do not substantially intermingle with fibers of the nanofiber layer 20, and fibers of the nanofiber layer 20 do not substantially intermingle with fibers of the second nonwoven layer 30. Discrete nonwoven layers 10, 20, and 30 may be joined by a suitable process such as laminating or by adhesives. For instance, in some embodiments, discrete nonwoven layers in the fibrous layer 100 may be joined by laminating. In some such cases, a discrete nonwoven layer may be joined to optional nonwoven layer(s) using adhesives. It should be appreciated, however, that certain embodiments may include one or more nonwoven layers or layers that are not discrete with respect to one another.

In some embodiments, the fibrous layer 100 may be continuous (e.g., electrospun fibers, meltblown fibers, spunbond fibers, etc.). For instance, fibrous layer 100 may have an average length of at least about 50 cm, at least about 100 cm, at least about 200 cm, at least about 500 cm, at least about 1000 cm, at least about 2000 cm; and/or less than or equal to about 2000 cm, less than or equal to about 1000 cm, less than or equal to about 500 cm, less than or equal to about 200 cm, less than or equal to about 100 cm, or less than or equal to about 50 cm. Combinations of the above-referenced ranges are also possible (e.g., greater than or equal to about 100 cm and less than or equal to about 2000 cm). Other values of average fibrous layer 100 length are also possible.

In some embodiments, protective clothing material 100 and/or fibrous layer 100 may include any suitable type of synthetic polymer. Examples of suitable fibrous layer may include polyurethane, polyester, polyimide, polypropylene, regenerated cellulose (e.g., Lyocell, rayon) polyaniline, and copolymers or derivative compounds thereof, and combinations thereof. In some embodiments, the fibrous layer 100 are hydrophobic. In some embodiments, the fibrous layer 100 are organic polymer fibers. The fibrous layer 100 may also include multi-component fibers (i.e., fibers having multiple components such as bicomponent fibers). In some cases, the fibrous layer 100 may be electrospun (e.g., melt, solvent), meltblown, or spunbond, which may be formed of polymers described herein (e.g., polyester, polypropylene). In some embodiments, the fibrous layer 100 may be electrospun fibers (e.g., polyurethane). In some embodiments, the fibrous layer 100 may be combination of meltblown layers, spunbond layers, and electrospun layer.

With reference still to FIGS. 1-2, the fibrous layer 100 may have a mean flow pore size less than or equal to about 1 micron, less than or equal to about 0.5 microns, less than or equal to about 0.1 microns, less than or equal to about 0.05 microns, less than or equal to about 0.02 microns. In some instances, the mean flow pore size may be greater than or equal to about 0.02 micron, greater than or equal to about 0.05 microns, greater than or equal to about 0.1 microns, greater than or equal to about 0.5 microns, greater than or equal to about 1 micron. The mean flow pore size may be determined according to the standard ASTM F316-03 (2019)—Standard Test Methods for Pore Size Characteristics of Membrane Filters by Bubble Point and Mean Flow Pore Test.

In some embodiments, the fibrous layer 100 may have a relatively high air permeability. For instance, in some embodiments, the fibrous layer 100 may have an air permeability of greater than or equal to about 1 $ft^3$/min (CFM), greater than or equal to about 2 CFM, greater than or equal to about 3 CFM, greater than or equal to about 4 CFM, greater than or equal to about 5 CFM, greater than or equal to about 6 CFM, greater than or equal to about 7 CFM, greater than or equal to about 8 CFM, or greater than or equal to about 9 CFM, or greater than or equal to about 10 CFM. In some instances, the air permeability of the fibrous layer 100 may be less than or equal to 10 CFM, less than or equal to 9 CFM, less than or equal to 8 CFM, less than or equal to 7 CFM, less than or equal to 6 CFM, less than or equal to 5 CFM, less than or equal to 4 CFM, less than or equal to 3 CFM, or less than or equal to 2 CFM, or less than or equal to 1 CFM. Combinations of the above-referenced ranges are also possible (e.g., greater than 1 CFM and less than or equal to 8 CFM, greater than 2 CFM and less than or equal to 10 CFM, greater than 5 CFM and less than or equal to 6 CFM). Other ranges are also possible. The air permeability may be determined using ASTM D737 (2018)—Standard Test Method for Air Permeability of Textile Fabrics.

In some embodiments, the fibrous layer 100 may be relatively lightweight. For instance, in some embodiments, the fibrous layer 100 for protective clothing may have a basis weight of less than or equal to about 60 $g/m^2$, less than or equal to 50 $g/m^2$, less than or equal to about 40 $g/m^2$, less than or equal to about 30 $g/m^2$, less than or equal to about 20 $g/m^2$, less than or equal to about 10 $g/m^2$, less than or equal to about 5 $g/m^2$, or less than or equal to about 1 $g/m^2$. In some instances, the fibrous layer may have a basis weight of greater than or equal to about 1 $g/m^2$, greater than or equal to about 5 $g/m^2$, greater than or equal to about 10 $g/m^2$, greater than or equal to about 20 $g/m^2$, greater than or equal to about 30 $g/m^2$, greater than or equal to about 40 $g/m^2$, greater than or equal to about 50 $g/m^2$, or greater than or equal to about 60 $g/m^2$. Combinations of the above-referenced ranges are also possible (e.g., greater than or equal to about 20 $g/m^2$ and less than or equal to about 40 $g/m^2$, greater than or equal to about 10 $g/m^2$ and less than or equal to about 60 $g/m^2$). The basis weight may be determined according to the standard ASTM D3776 (2013)—Standard Test Methods for Mass Per Unit Area (Weight) of Fabric.

In some embodiments, the fibrous layer 100 may be relatively thin. For instance, in some embodiments, the thickness of the fibrous layer 100 may be less than or equal to about 0.2 mm, less than or equal to about 0.1 mm, less than or equal to about 0.075 mm, less than or equal to about 0.05 mm, less than or equal to about 0.025 mm, less than or equal to about 0.01 mm. In some instances, the thickness of the fibrous layer 100 may be greater than or equal to about 0.01 mm, greater than or equal to about 0.025 mm, greater than or equal to about 0.05 mm, greater than or equal to about 0.075 mm, greater than or equal to about 0.1 mm, or greater than or equal to about 0.2 mm. Combinations of the above referenced ranges are also possible (e.g., greater than or equal to about 0.05 mm and less than or equal to about 0.2 mm, greater than or equal to about 0.1 mm and less than or equal to about 0.15 mm). The thickness may be determined according to the standard ASTM D1777 (2019)—Standard Test Method for Thickness of Textile Materials.

In some embodiments, the fibrous layer 100 may be relatively breathable. For instance, in some embodiments, the fibrous layer 100 may have a moisture vapor transmission rate (MVTR) of greater than or equal to about 1000 $g/m^2$/day, greater than or equal to about 3000 $g/m^2$/day, or greater than or equal to about 5000 $g/m^2$/day, greater than or equal to about 10000 g/m²/day, greater than or equal to about 20000 g/m²/day, greater than or equal to about 30000 g/m²/day, greater than or equal to about 50000 g/m²/day, greater than or equal to about 100000 g/m²/day. In some embodiments, the fibrous layer may have a moisture vapor transmission rate of less than or equal to about 100000 g/m²/day, less than or equal to about 50000 g/m²/day, less than or equal to about 30000 g/m²/day, less than or equal to about 20000 g/m²/day, less than or equal to about 10000 g/m²/day, less than or equal to about 5000 g/m²/day, less than or equal to about 3000 g/m²/day, or less than or equal to about 1000 g/m²/day. Combinations of the above-referenced ranges are also possible (e.g., greater than or equal to about 1000 g/m²/day and less than or equal to about 50000 g/m²/day, or greater than or equal to about 20000 g/m²/day and less than or equal to about 100000 g/m²/day). The moisture vapor transmission rate may be determined according to the standard ASTM D6701.

With reference still to FIGS. 1-2, the protective clothing material 100 may comprise an outer nonwoven layer 10 configured to prevent transmission of low-pressure liquids e.g., spray of liquid or blood, saliva. In such embodiments, the protective clothing material 100 may comprise an inner nonwoven layer 30 configured to repel hydrophilic fluids e.g., bodily fluids. In some embodiments, the inner nonwoven layer 30 may have a pore size and fiber diameter that impart breathability and good air permeability to the layer.

In some embodiments, the outer nonwoven layer 10 may be splash resistant. As used herein, the terms "splash resistant" or "spray impact resistant" or equivalent has the ordinary meaning in the art and may refer to the ability of the layer to resist penetration of sprayed fluid or blood. In some embodiments, the splash resistance of a layer and/or the protective clothing material may be determined using AATCC 42, which measures the resistance to the penetration of water by impact. Briefly, a 500 mL of deionized water is sprayed against a taut surface of a test specimen backed by a pre-weighed blotter using 2" diameter spray head having 25 holes at a height of 0.6 m. The test specimen backed by the pre-weighed blotter is angled at 45 degrees. The blotter is then reweighed to determine water penetration and the specimen is classified accordingly. If the difference in weight is less than 1.0 g, the specimen is splash resistant. In some embodiments, the difference in weight, according to this test, of the nonwoven layer, fibrous layer, and/or protective clothing material 100 may be less than 1.0 g (e.g., less than 0.8 g, less than 0.6 g, less than 0.3 g)

With reference still to FIGS. 1-2, in some embodiments, the nonwoven layer 20 of the protective clothing material 100 is mainly constructed of nano membranes fiber, which may comprise fibers having a relatively large fiber diameter that contribute to the breathability of the protective clothing material 100. For instance, in some embodiments, the average fiber diameter of the nonwoven layer 20 may be greater than or equal to about 0.02 microns, greater than or equal to about 0.05 microns, greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.75 microns, greater than or equal to about 1 microns, or greater than or equal to about 2 microns. In some instances, the average fiber diameter may be less than or equal to about 2 microns, less than or equal to about 1 micron, less than or equal to about 0.75 microns, less than or equal to about 0.5 microns, less than or equal to about 0.4 microns, less than or equal to about 0.3 microns, less than or equal to about 0.2 microns, less than or equal to about 0.1 microns, less than or equal to about 0.05 microns or less than or equal to about 0.02 microns. Combinations of the above-referenced ranges are also possible (e.g., greater than or equal to about 0.02 microns and less than or equal to about 1 micron, greater than or equal to about 0.2 microns and less than or equal to about 0.5 microns).

Figure 3:
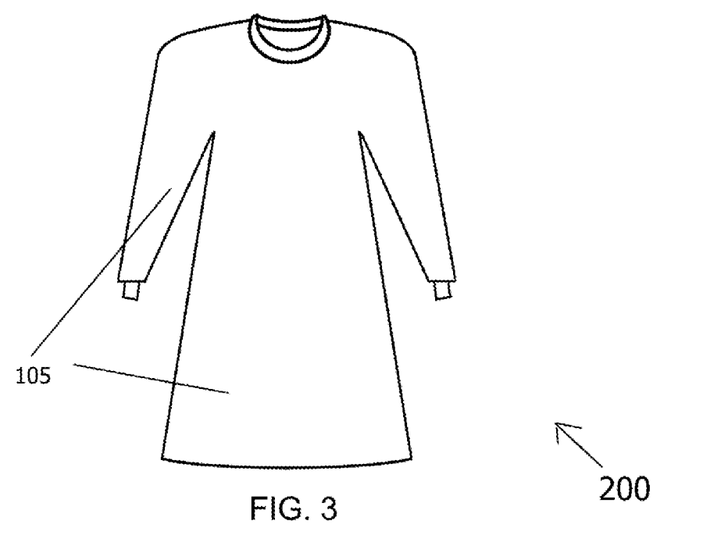
FIG. 3 is a schematic of a surgical gown constructed with a protective clothing material according to embodiments of the disclosure.
Figure 4:
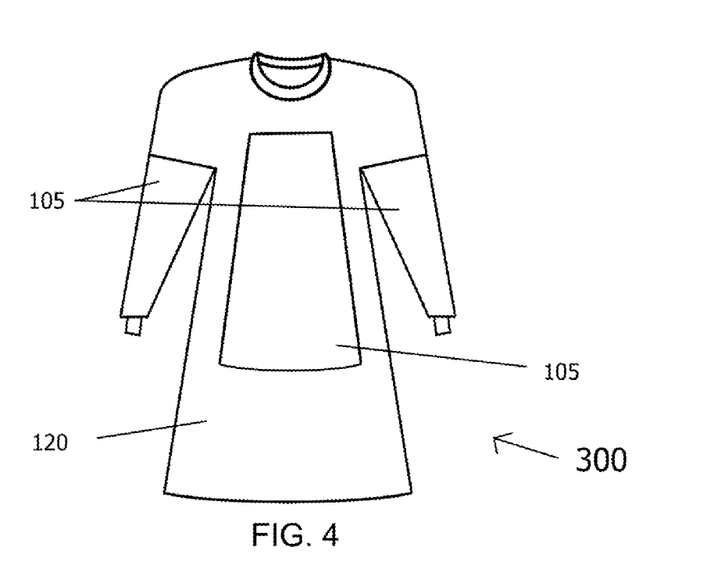
FIG. 4 is a schematic of a surgical gown portions of which are constructed with a protective clothing material according to embodiments of the disclosure.

With reference now to FIGS. 3-4, there are shown examples of surgical gowns constructed with the fibrous material 100 of the disclosure. FIG. 3 depicts a surgical gown 200 constructed entirely or substantially entirely with a protective clothing material 100 of the disclosure. As shown in FIG. 3, a fibrous material 100 or a monolithic fibrous layer 100 of the disclosure can be used to construct substantially all portions 105 of the surgical gown 200. FIG. 4 depicts a surgical gown 300 wherein a critical portion or portions 105 of the gown 300 such as the sleeve portions and/or front zone of the gown 300 are constructed with the protective clothing material 100 of the disclosure. The less critical portions 120 of the gown 300 can be constructed with conventional nonwoven material such as SMS or other nonwoven material. The fibrous material used to construct the surgical gown 200 or critical portions of the gown 300 can be a fibrous layer 100 illustrated in FIGS. 1-2.

It should be pointed out that surgical gowns 200 and 300 are shown in FIGS. 3-4 for illustration purpose. The fibrous material 100 of the disclosure can be used to construct other protective garments or surgical apparel, including and not limited to surgical caps, hoods, masks, operating room shoes, shoe covers, and other medical devices that are intended to be worn by operating room personnel during surgical procedures to protect both the surgical patient and the operating room personnel. In certain embodiments, the protective clothing material may be used to form surgical drapes. The term "surgical drape" has its ordinary meaning in the art and may be in accordance with the 21 C.F.R. § 878.4370(a) (2012)—Surgical Drape and Drape Accessories. For example, a surgical drape may be a device made of natural or synthetic materials intended to be used as a protective patient covering, such as to isolate a site of surgical incision from microbial and other contamination. In certain embodiments, the device may include a plastic wound protector that may adhere to the skin around a surgical incision or be placed in a wound to cover its exposed edges. In some instances, the device may include a self-retaining finger cot that is intended to allow repeated insertion of the surgeon's finger into the rectum during performance of a transurethral prostatectomy. One of ordinary skill in the art would be knowledgeable about methods of forming surgical garments from protective clothing material. In general, the protective clothing material 100 is cut and sewn together as in traditional garment manufacturing, except heat sealing and/or ultrasonic seaming are used instead of traditional sewing techniques for surgical garments involving thread. Heat sealing or ultrasonic seaming is used to form a good seal (e.g., impermeable seal), while maintaining the integrity of the garment and barrier protection. During use, the protective clothing material 100 mechanically trap contaminants (e.g., bodily fluid, microbes) and prevents strikethrough. The protective clothing material 100 need not be electrically charged to enhance trapping of contamination. Thus, in some embodiments, the protective clothing material 100 of the disclosure is not electrically charged. In some embodiments, the protective clothing material 100 may be electrically charged.

With reference to FIGS. 3-4, the surgical gowns 200, 300 constructed with the fibrous material 100 of the disclosure can provide ANSI/AAMI level 4 protection rating. The protective garments passed the ASTM F1671-13 Method B (i.e., viral penetration) and ASTM F1670-08 (i.e., synthetic blood penetration) test required for ANSI/AAMI level 4 certification.

With reference to FIGS. 3-4, the surgical gowns 200, 300 constructed with the fibrous material 100 of the disclosure provide good wearability or comfort, due to the relatively high air permeability of the fibrous material 100 of the disclosure. For instance, in some embodiments, the surgical gowns 200, 300 may have an air permeability of greater than or equal to about 1 ft$^3$/minute (CFM), greater than or equal to about 2 CFM, greater than or equal to about 3 CFM, greater than or equal to about 4 CFM, greater than or equal to about 5 CFM, greater than or equal to about 6 CFM, greater than or equal to about 7 CFM, greater than or equal to about 8 CFM, greater than or equal to about 9 CFM or greater than or equal to about 10 CFM. In some instances, the air permeability may be less than or equal to about 10 CFM, less than or equal to about 9 CFM, less than or equal to about 8 CFM, less than or equal to about 7 CFM, less than or equal to about 6 CFM, less than or equal to about 5 CFM, less than or equal to about 4 CFM, less than or equal to about 3 CFM, less than or equal to about 1 CFM or less than or equal to about 1 CFM. All combinations of the above-referenced ranges are possible (e.g., greater than about 1 CFM and less than or equal to about 10 CFM, greater than about 2 CFM and less than or equal to about 6 CFM).

With reference to FIGS. 3-4, the surgical gowns 200, 300 constructed with the fibrous material 100 of the disclosure are breathable. For instance, in some embodiments, the surgical gowns 200, 300 may have a moisture vapor transmission rate of greater than or equal to about 1000 g/m$^2$/day, greater than or equal to about 3000 g/m$^2$/day, or greater than or equal to about 5000 g/m$^2$/day, greater than or equal to about 10000 g/m$^2$/day, greater than or equal to about 20000 g/m$^2$/day, greater than or equal to about 30000 g/m$^2$/day, greater than or equal to about 50000 g/m$^2$/day, greater than or equal to about 100000 g/m$^2$/day. In some embodiments, the fibrous layer may have a moisture vapor transmission rate of less than or equal to about 100000 g/m$^2$/day, less than or equal to about 50000 g/m$^2$/day, less than or equal to about 30000 g/m$^2$/day, less than or equal to about 20000 g/m$^2$/day, less than or equal to about 10000 g/m$^2$/day, less than or equal to about 5000 g/m$^2$/day, less than or equal to about 3000 g/m$^2$/day, or less than or equal to about 1000 g/m$^2$/day. Combinations of the above-referenced ranges are also possible (e.g., greater than or equal to about 1000 g/m$^2$/day and less than or equal to about 50000 g/m$^2$/day, or greater than or equal to about 20000 g/m$^2$/day and less than or equal to about 100000 g/m$^2$/day). The moisture vapor transmission rate may be determined according to the standard ASTM D6701.

With reference to FIGS. 3-4, the surgical gowns 200, 300 constructed with the fibrous material 100 of the disclosure are lightweight. For instance, in some embodiments, the surgical gowns 200, 300 may have a basis weight of greater than or equal to about 1 g/m$^2$, greater than or equal to about 5 g/m$^2$, greater than or equal to about 10 g/m$^2$, greater than or equal to about 20 g/m$^2$, greater than or equal to about 30 g/m$^2$, greater than or equal to about 40 g/m$^2$, greater than or equal to about 50 g/m$^2$, or greater than or equal to about 60 g/m$^2$. In some instances, the protective clothing material may have a basis weight of less than or equal to about 60 g/m$^2$, less than or equal to about 50 g/m$^2$, less than or equal to about 40 g/m$^2$, less than or equal to about 30 g/m$^2$, less than or equal to about 20 g/m$^2$, less than or equal to about 10 g/m$^2$, less than or equal to about 5 g/m$^2$, or less than or equal to about 10 g/m$^2$. Combinations of the above-referenced ranges are also possible (e.g., greater than or equal to about 1 g/m$^2$ and less than or equal to about 60 g/m$^2$, greater than or equal to about 5 g/m$^2$ and less than or equal to about 50 g/m$^2$).

With reference to FIGS. 3-4, the surgical gowns 200, 300 constructed with the fibrous material 100 of the disclosure have relatively high hydrostatic pressure or hydrostatic head range, e.g., greater than or equal to about 100 cm H$_2$O. For instance, in some embodiments, the hydrostatic pressure or hydrostatic head range of the protective clothing material and/or the fibrous layer may be greater than or equal to about 50 cm H$_2$O, greater than or equal to about 75 cm H$_2$O, greater than or equal to about 100 cm H$_2$O, greater than or equal to about 125 cm H$_2$O, greater than or equal to about 150 cm H$_2$O, greater than or equal to about 175 cm H$_2$O, greater than or equal to about 200 cm H$_2$O, greater than or equal to about 225 cm H$_2$O, greater than or equal to about 250 cm H$_2$O, greater than or equal to about 275 cm H$_2$O, or greater than or equal to about 300 cm H$_2$O. In some instances, the hydrostatic pressure or hydrostatic head range may be less than or equal to about 300 cm H$_2$O, less than or equal to about 275 cm H$_2$O, less than or equal to about 250 cm H$_2$O, less than or equal to about 225 cm H$_2$O, less than or equal to about 200 cm H$_2$O, less than or equal to about 175 cm H$_2$O, less than or equal to about 150 cm H$_2$O, less than or equal to about 125 cm H$_2$O, or less than or equal to about 100 cm H$_2$O. Combinations of the above-referenced ranges are possible (e.g., greater than or equal to about 50 cm H$_2$O and less than or equal to about 300 cm H$_2$O, greater than or equal to about 100 cm H$_2$O and less than or equal to about 200 cm H$_2$O).

FIG. 8 is a schematic illustrating the correlation between hydrophobicity and surface energy. The contact angle ($\Theta$) 601 in FIG. 8 is the angle between the substrate surface 604 and a tangent line 603 drawn to the water droplet 602 surface at the three-phase point or when a liquid is resting on the substrate surface 604. In general, the contact angle of one or more nonwoven layers, one or more layers (e.g., nonwoven layer), and/or the protective clothing material 100 may be selected to repel a fluid (e.g., hydrophilic fluid). In some embodiments, the water contact angle on a surface of one or more nonwoven layers, one or more layers, and/or the protective clothing material may be greater than 90 degrees, greater than or equal to 100 degrees, greater than or equal to 105 degrees, greater than or equal to 110 degrees, greater than or equal to 115 degrees, greater than or equal to 120 degrees, greater than or equal to 125 degrees, greater than or equal to 130 degrees, greater than or equal to 135 degrees, greater than or equal to 145 degrees, greater than or equal to 150 degrees, greater than or equal to 155 degrees, greater than or equal to 160 degrees, or greater than or equal to about 165 degrees. In some instances, the water contact angle is less than or equal to about 165 degrees, less than or equal to about 160 degrees, less than or equal to about 150 degrees, less than or equal to about 140 degrees, less than or equal to about 130 degrees, less than or equal to about 120 degrees, less than or equal to about 110 degrees, or less than or equal to about 100 degrees. Combinations of the above-referenced ranges are also possible (e.g., greater than or equal to about 90 degrees and less than or equal to about 165 degrees). The contact angle ($\Theta$) 601 in FIG. 8 illustrates that the higher the contact angle, the lower the surface energy, and the surface is more hydrophobic. With the decreasing contact angle, the surface energy will increase and conversely decrease surface tension to make the surface more hydrophilic. A contact angle meter or goniometer (not shown) can be used for this determination, or the water contact angle may be measured using standard ASTM D5946 (2017)—Standard Test Method for Corona-Treated Polymer Films Using Water Contact Angle Measurements.

Method of Making Fibrous Materials

In general, a method of making a fibrous material or layer according to embodiments of the disclosure comprises the following step. A first nonwoven layer and a nanofiber layer are provided. A polyurethane reactive resin is applied to the first nonwoven layer in an amount of 2 to 30 g/m$^2$. The nanofiber layer is then laminated to the first nonwoven layer applied with the polyurethane reactive resin and pressed to form the fibrous layer. In various embodiments, the method may further comprise the step of providing a second nonwoven layer, applying a polyurethane reactive resin in the amount of 2 to 30 g/m$^2$ to the second nonwoven layer, and laminating the second nonwoven layer with the nanofiber layer-first nonwoven layer laminate and pressing.

Figure 7A:
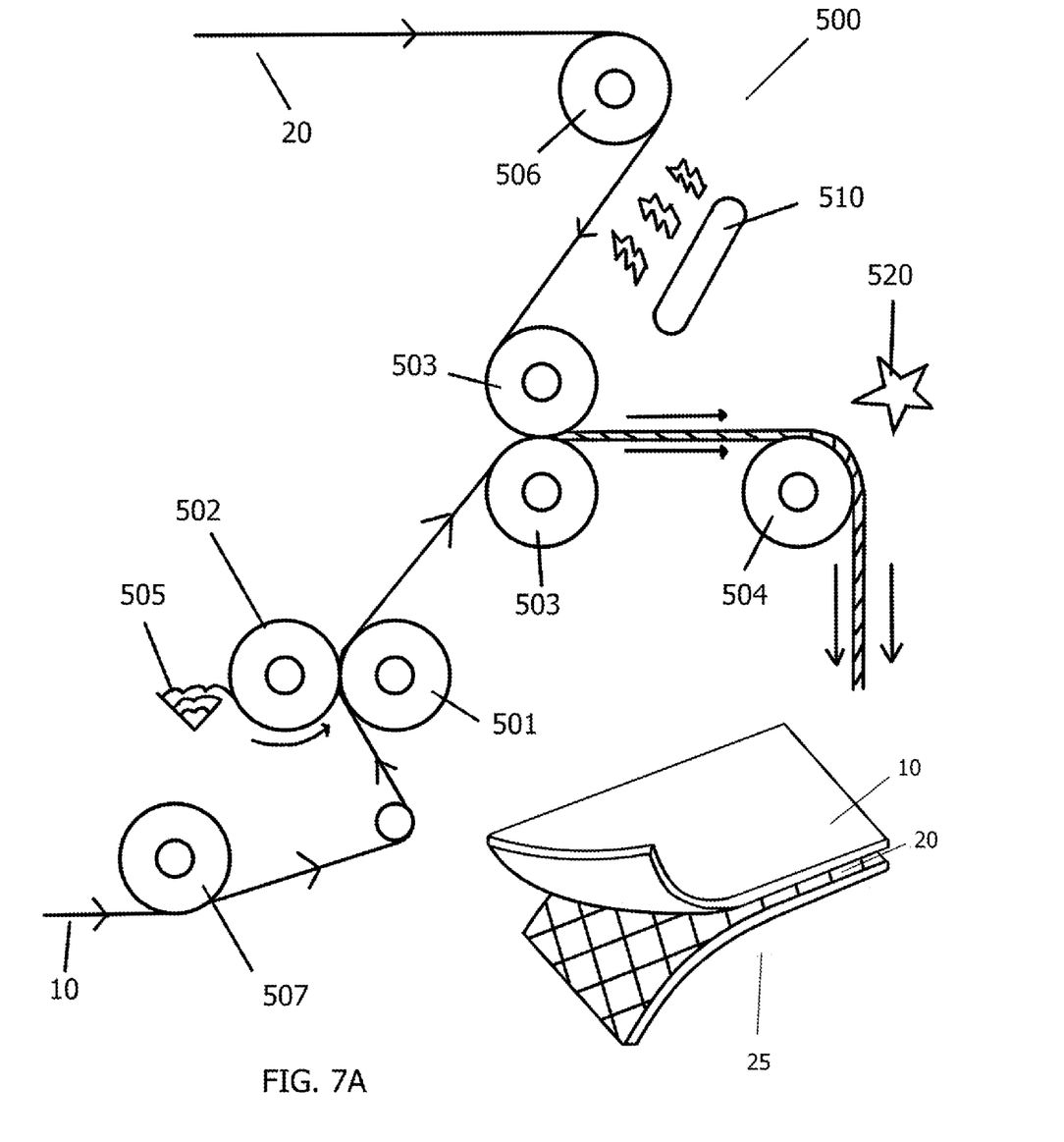
FIGS. 7A and 7B are schematics showing a method of making a fibrous layer according to embodiments of the disclosure.
Figure 7B:
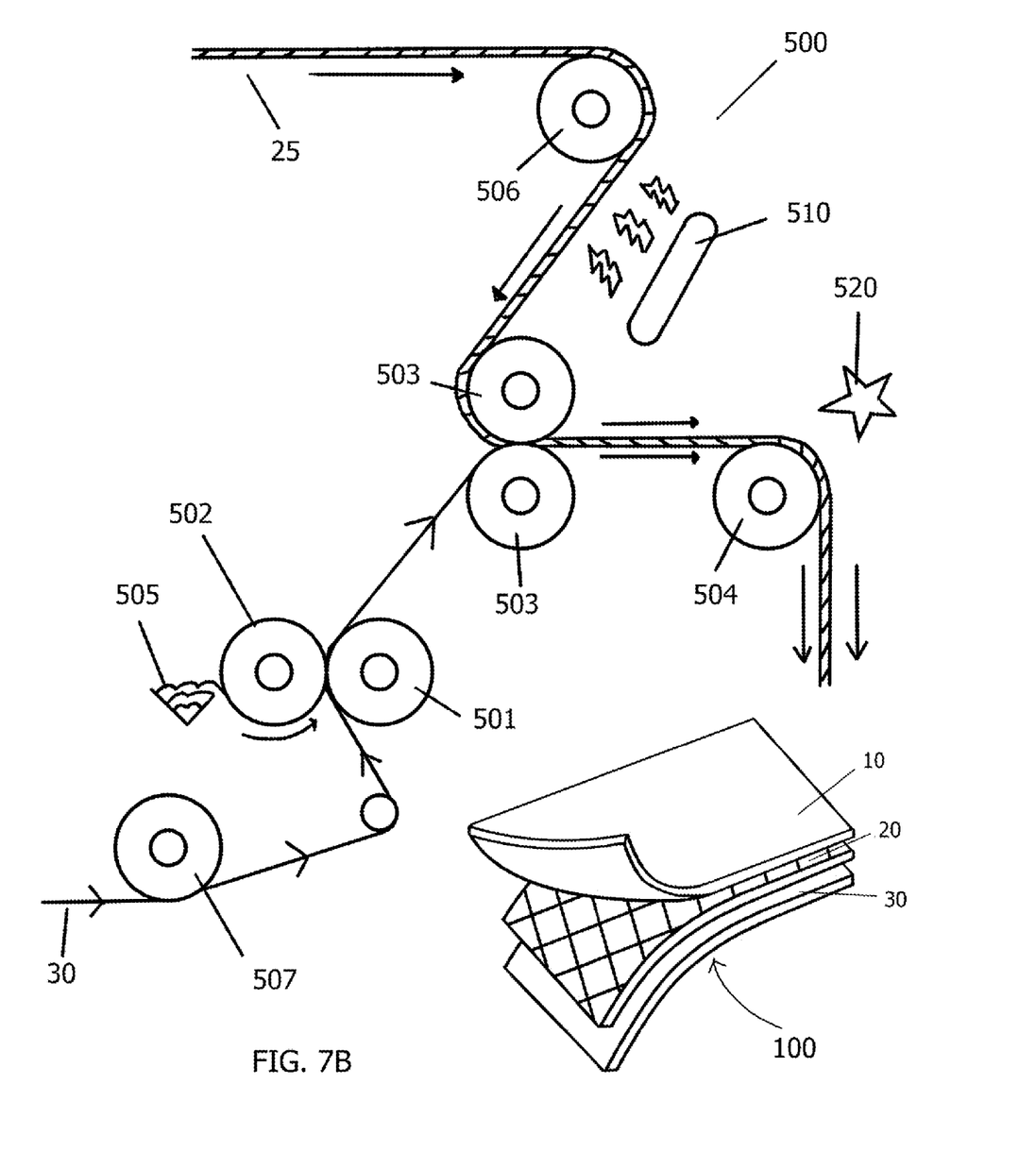

With reference to FIGS. 7A-7B, an example method of making a fibrous layer 100 is now described. In a broad overview, a first nonwoven layer 10 and a nanofiber layer 20 are provided e.g., via rollers 507 and 506 respectively, as shown in FIG. 7A. An adhesive 505 may be applied to the first nonwoven layer 10 e.g., via rollers 502 and 501. The first nonwoven layer 10 applied with the adhesive 505 and the nanofiber layer 20 are pressed against each other e.g., by using rollers 503, to form a laminate 25 comprising the first nonwoven layer 10 and the nanofiber layer 20. The laminate 25 of the first nonwoven layer 10 and the nanofiber layer 20 may be wound by using a roller 504. In FIG. 7B, the laminate 25 may be further joined with a second nonwoven layer 30 to form a fibrous layer 100 comprising a first nonwoven layer 10, a second nonwoven layer 30, and a nanofiber layer 20 between the first and second nonwoven layers 10, 30. In particular, the second nonwoven layer 30 is provided e.g., via a roller 507. An adhesive 505 may be applied to the second nonwoven layer 30 e.g., via rollers 502 and 501. The second nonwoven layer 30 applied with the adhesive 505 and the laminate 25 are pressed against each other e.g., by using rollers 503, to form fibrous layer 100 comprising the first nonwoven layer 10, the second nonwoven layer 30, and the nanofiber layer 20 between the first and second nonwoven layers 10, 30. The fibrous layer 100 may be wound e.g., by using a roller 504. FIG. 6 schematically shows a monolithic fibrous layer 100 comprising a first nonwoven layer 10, a second nanofiber layer 20, a third nonwoven layer 30, an adhesive layer 15 between the first nonwoven layer 10 and the second nanofiber layer 20, and an adhesive layer 15 between the third nonwoven layer 30 and the second nanofiber layer 20.

With reference to FIGS. 7A-7B, suitable adhesives 505 include polyurethanes, acrylic, ethyl vinyl acetate, copolyesters, polyolefins, polyamides, thermoplastic elastomers, polycarbonates, silicones, and any combinations thereof. According to the similarity and inter miscibility, the solubility parameter of the adhesive 505 and the nanofiber layer 20 are preferably similar so that the peel strength among the layers 10, 20, and 30 is as high as possible. In some embodiments, the laminating process conditions such as the heating temperature during laminating the first nonwoven layer 10, the nanofiber layer 20, and/or the second nonwoven layer 30, are controlled to provide a desirable peel strength of the monolithic fibrous layer 100.

By way of example, the laminating temperature can be set from 60° C. to 140° C., preferably at 70-120° C. In some embodiments, the laminating time can range from 1 second to 25 seconds, preferably in the range of 5 to 20 seconds. The peel strength or adhesive strength of the laminated fibrous layer 100 is generally related to the laminating heating conditions. Therefore, it is desirable to control the choice of the adhesive 505 and the laminating heating conditions along with other parameters of the laminating process. It should be noted that in alternative embodiments, the first nonwoven layer 10, the nanofiber layer 20, and the second nonwoven layer 30 may be joined to form a monolithic fibrous layer 100 by other processes. For example, the first nonwoven layer 10, the nanofiber layer 20, and the second nonwoven layer 30 may be unlaminated. In certain embodiments, the fibrous layer 100 may be a complete monolithic laminated layer. In some such cases, fibrous layer 100 may be laminated between the first nonwoven layer 10 and the nanofiber layer 20, and unlaminated between the nanofiber layer 20 and the second nonwoven layer 30. Protective clothing materials having such constructions may have particularly beneficial properties.

The laminating process according to embodiments of the disclosure can enhance both the water resistance and the moisture permeability of the fibrous layer 100 simultaneously. While the waterproof and moisture permeability of the laminated fabric can be generally achieved by choosing the types of nonwoven layers 10 and 30, the pore sizes of the electrospun nanofiber layer 20, the inventors discovered that an optimal laminating process condition, choice of the adhesive 505, among other conditions can enhance the water resistance and increase moisture permeability of the fibrous layer 100. Waterproof and moisture permeable fabrics, or waterproof and breathable fabrics for the protective clothing material or fibrous layer 100 are widely desired for the ASTM F1671 level 4 protection and healthcare worker's comfort. The properties of permeability to water vapor and resistance to water droplets are particularly important to medical applications, which can be constructed into high density woven fabrics, coated fabrics and laminated fabrics. In addition, the nonwoven layer 20 can be an electrospun nanofiber layer, providing good water vapor transmission capability due to the porous structure of the electrospun nanofiber layer.

In some embodiments, a one-component or two-component polyurethane resin e.g., polyurethane reactive resin, is used as the adhesive 505 and applied to the nonwoven layer 10 or 30 e.g., by using gravure rollers or flat rollers 502. In a specific embodiment, a moisture-curing type 100% solids polyurethane reactive resin is used. By way of example, the polyurethane reactive resin in an amount of 2 to 30 g/m$^2$ can be applied to the nonwoven layer 10, 30 or nanofiber layer 20 using a gravure roller or a flat roller 502. In this embodiment, the 100% solids polyurethane reactive resin containing no solvent can be melted with heat, which simplifies the process and is environmentally friendly. In some embodiments, the polyurethane resin or adhesive 505 may be heated starting at a temperature of 50° C.-60° C. before reaching a liquid phase at 70° C. Since no solvent is used, even if the adhesive resin 505 is applied on the nanofiber layer 20, the temperature of the gravure roller 502 can be lowered to a level of 70° C. to 100° C. (lower than conventional 100° C. or more), thereby preventing damage to the nanofiber layer 20 due to heat. In addition, potential damage caused by solvents can be avoided, as such, the adhesive resin 505 can be alternatively applied on the nanofiber layer 20. In some embodiments, it is preferable to apply the adhesive resin 505 to the nonwoven layer 10 or 30 in consideration of the process and lamination stability.

With reference to FIGS. 7A-7B, after applying the polyurethane reactive resin adhesive 505 on the nonwoven layer 10, lamination can be performed while pressing the nanofiber layer 20 to the nonwoven layer 10 e.g., with driving rollers 503. The driving rollers 503 can be general rollers with a vertical, horizontal or descending structure, and preferably calendar rollers and rubber rollers to maintain the mechanical structure in order to stabilize the laminated structure of the nanofiber layer 20. During the lamination process, the humidity condition in the air can be maintained at 40% to 80% in order to accelerate the curing of the adhesive 505. The laminated fibrous layer 25 in FIG. 7A can be wound with the roller 504 and aged for 10 to 36 hours in an aging room under conditions of a temperature of 25° C. to 35° C. at a relative humidity of 65% to 80% during a humidification process 520. It is desirable to keep the tension, during the winding process with the roller 504, of the resulting laminated fibrous layer 25 (FIG. 7A) after lamination, e.g., below 3 kilogram-force (kgf) to prevent damage to the structure of the nanofiber layer 20.

With reference to FIGS. 7A-7B, by the lamination process shown in FIG. 7A, a two-layer fibrous layer 25 is formed where the nonwoven layer 10 and the nanofiber layer 20 are bonded or laminated and constructed. The two-layer fibrous layer 25 are light and soft, and the advantages and functionality of the nanofiber layer 20 itself can be maximized. In some applications, the usage of a two-layer fibrous layer may cause damage to the nanofiber layer 20. As such, a separate lining or nonwoven layer 30 can be added for sewing and protection of the nanofiber layer 20, as shown in FIG. 7B. Therefore, by bonding another nonwoven layer 30 to the two-layer fibrous layer 25, as shown in FIG. 7B, it is possible to make a three-layer fibrous layer 100 to protect the nanofiber layer 20 and make the fibrous layer 100 sewable. According to embodiments of the disclosure, a nonwoven layer 10 can be bonded on the external side of the nanofiber layer 20 and a nonwoven layer 30 on the internal side of the nanofiber layer 20. As such, the nanofiber layer 20 can be sufficiently protected in the middle to improve the functionality and durability. The internal nonwoven layer 30 can also improve the feel of direct contact with the skin.

In some embodiments, it is preferable to use calendar rollers and rubber rollers 503 as the driving rollers, at a temperature of 90° C. to 100° C., to strengthen the adhesion between the nonwoven layer 10 and the nanofiber layer 20 and between the nonwoven layer 30 the nanofiber layer 20, and stabilize or maintain the laminated structure of the nanofiber layer 20 in the finished fibrous layer 100.

With reference to FIG. 7A and FIG. 7B, in some embodiments, an infrared (IR) heater 510 can be used to ensure the surface of the nanofiber layer 20 or laminate 25 to be more hydrophilic, which can increase the laminating or bonding efficiency and stabilize the surface appearance. In some embodiment, a ceramic heater can be used. Depending on the type of heaters, the distance between the heater 510 and the layer 20 or 25 can be adjusted to ensure the laminating or bonding efficiency. In some embodiments, an IR heater 510 is set at 60° C. and thus the surface temperature of the layer 20 or 25 to be bonded can be less than 60° C. as the roller 506 is being continuously operated. The exposure of the IR heater 510 and its temperature on the material is also dependent on the speed of the rollers 506, 503 and 504. In some embodiments, the curing mechanism of the polyurethane adhesive 505 is a moisture curing type. As such, a humidification step 520 can be performed to allow the curing to proceed more smoothly when the completed fibrous layer 25 and 100 are aged and cured in the aging room where temperatures between 24° C. to 30° C. and 70% relative humidity are maintained.

WORKING EXAMPLES

Embodiments of the disclosure will now be described in connection with working examples. It should be pointed out that while some specific details are set forth in the working examples in order to provide a thorough understanding of the disclosure, it will be apparent to one of ordinary skill in the art that some of these specific details may not be employed to practice embodiments of the disclosure. In other instances, some well-known details may not be described in order to avoid unnecessarily obscuring embodiments of the disclosure.

Example 1

A two-component polyurethane resin with 70% solid content was applied to one side of a nonwoven layer 10 in the amount of 10 g/m$^2$. The solvent was evaporated with a dryer at about 45° C. A nanofiber layer 20 was laminated on the nonwoven layer and heated at a temperature about 90° C. The two layers were laminated by pressure compression while passing through heated rollers 503, as shown in FIG. 7A. After lamination, the process tension pulled by a winding roller 504 or the like was maintained at 3 kgf or less. The reaction was completed by aging at a temperature of 50° C. for 12 hours to make a laminated two-layer fibrous layer 25.

Example 2

On one side of the nonwoven layer 10, moisture-curable 100% solids polyurethane-reactive resin 505 was dissolved, applied in the amount of 10 g/m$^2$, as shown in FIG. 7A. A nanofiber layer 20 was laminated with the nonwoven layer 10. During lamination, the nanofiber layer 20 and the nonwoven layer 10 were pressed together with the rubber rollers 503 while applying heat at a temperature of 90° C. to the roller 503. The humidity condition was maintained at about 60%. In the winding process with roller 504 after lamination, the tension was maintained at 3 kgf or less. After rewinding, the final process was completed by aging for 12 hours in an aging room at 30° C. and 70% relative humidity to complete the laminated 2-layer fibrous layer 25.

Examples 3 and 4

A moisture curable 100% solids polyurethane-reactive resin was applied to the nanofiber layer 20 of each of the two layers of Examples 1 and 2 in the amount of 10 g/m$^2$.

Comparative Example 1

Same conditions as in Example 1 were used except that the process tension at the time of rewinding after lamination was 4 kgf or more.

Comparative Example 2

Same conditions as in Example 1 were used except that the adhesive resin was applied to the nanofiber layer 20.

For the products prepared in Examples 1, 2, and Comparative Examples 1 and 2, the appearance of the product surface was visually inspected, and the feel of the surface was measured. In addition, the slip property was tested using the method of ASTM D1894—Standard Test Method for Static and Kinetic Coefficients of Friction of Plastic Film and Sheeting, and the peel strength was tested using the method of ASTM D2724—Standard Test Method for Bond Strength of Bonded, Fused, and Laminated Apparel Fabrics.

In embodiments where the adhesive contains a solvent, 2 to 30 g/m² of a polyurethane resin 505 with a solid content of 30% to 80% was applied on the nonwoven layer 10 using a gravure roller 505. The surface energy of the nonwoven layer 10 may be different depending on the thickness of the nonwoven layer 10, the texture, the yarn, the weight, and the content of the post processing, etc. As such, penetration of the adhesive component and the actual application amount would be different (the higher the surface energy, the greater the application amount of the adhesive resin should be on the nonwoven layer 10). If too much polyurethane resin or adhesive 505 is used, the fibrous layer 100 would result in a decrease in functionality, making it difficult to take advantage of the light and soft nanofiber layer, and would not be as breathable. If too little polyurethane resin or adhesive 505 is used, the adhesive strength would be weak between the layers 10, 20, and 30, and peeling of the layers may occur, which would severely undermine the fibrous layer's function.

The solvent component contained in the polyurethane resin 505 was evaporated with a dryer at 40° C. to 120° C. to minimize damage to the nanofiber layer 20 caused by the solvent. If the temperature of the dryer is too low, it would not be easy to volatilize the solvent component. However, it is not necessary to raise the temperature higher than needed. In conventional methods, adhesives are applied to a nanofiber layer, causing damages to the nanofiber layer by the solvent contained in the adhesives.

The fibrous materials prepared by the method of the disclosure were tested and their properties were evaluated. The tests were conducted according to ASTM D 6701-21 Standard Test Method for Determining Water Vapor Transmission Rates by SGS in Appleton, Wis. Table 1 provides a test result of breathability or Water Vapor Transmission Rate (g/m²/day) of the fibrous materials according to embodiments of the disclosure.

TABLE 1

Water Vapor Transmission Rates (gram/m²/day)

| Test Sample | Vista 3-Vista Health 3 gram/m² of nanofiber layer | Vista 5-Vista Health 5 gram/m² of nanofiber layer | Cardinal Health-Cardinal Health Smartgown ™ |
| --- | --- | --- | --- |
| 1 | 31826 | 31117 | 6075 |
| 2 | 31202 | 35510 | 5811 |
| 3 | 32024 | 31281 | 5948 |
| 4 | 32276 | 35956 | 6271 |
| 5 | 32119 | 34510 | 6106 |
| 6 | 32467 | 33402 | 5930 |
| Average | 31986 | 33629 | 6023 |
| Std. Dev. | 441.6 | 2078.7 | 161.7 |
| Maximum | 32467 | 35956 | 6271 |
| Minimum | 31202 | 31117 | 5811 |
| n = | 6 | 6 | 6 |

In Table 1, Vista 3 is a sample fibrous material of the disclosure, comprising a 25 g/m² SMS nonwoven layer, a 3 g/m² nanofiber layer, and 20 g/m² SS nonwoven later having a collective basis weight of 48 g/m². Vista 5 is another sample fibrous material of the disclosure, comprising a 25 g/m² SMS nonwoven layer, a 5 g/m² nanofiber layer, and 20 g/m² SS nonwoven later having a collective basis weight of 50 g/m². Cardinal Health is a comparison sample, Smartgown™, obtained from Cardinal Health of 7000 Cardinal Place, Dublin, Ohio 43017. The data in Table 1 show that the fibrous materials of the disclosure have excellent breathability, with a transmission rate more than five times better than that of the best conventional fabric currently available on the market.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise. Further, the term "first" or "second" etc. may be used to distinguish one element from another in describing various similar elements. It should be noted the terms "first" and "second" as used herein include references to two or more than two. Further, the use of the term "first" or "second" should not be construed as in any particular order unless the context clearly dictates otherwise. The term "comprises" is open language that requires the presence of the recited element or structure or its equivalent, but does not exclude the presence of other elements or structures. The term "comprises" has the same meaning and is interchangeable with the terms "includes" and "has."

Those skilled in the art will appreciate that various other modifications may be made. All these or other variations and modifications are contemplated by the inventors and within the scope of the invention.

What is claimed is:

1. A method of making a fibrous layer, comprising,
   providing a first nonwoven layer and a nanofiber layer, the nanofiber layer comprising expanded polytetrafluoroethylene (ePTFE);
   applying a polyurethane reactive resin in an amount of 2 to 30 g/m² to the first nonwoven layer,
   laminating the nanofiber layer to the first nonwoven layer applied with the polyurethane reactive resin and pressing to form the fibrous layer.

2. The method of claim 1, wherein the polyurethane reactive resin comprises moisture curable 100% solids polyurethane.

3. The method of claim 2, wherein in the applying step the polyurethane reactive resin is heated at a temperature of 50° C. to 70° C.

4. The method of claim 2, wherein the pressing of the nanofiber layer and the first nonwoven layer is carried out using driving rollers heated at a temperature of 80° C. to 120° C.

5. The method of claim 2, wherein the pressing of the nanofiber layer and the first nonwoven layer is carried out under a pressure of about 5 bar.

6. The method of claim 2, further comprising curing the fibrous layer at a temperature of 25° C. to 35° C. and a relative humidity of 65% to 80% for 24 to 48 hours.

7. The method of claim 2, further comprising winding the fibrous layer.

8. The method of claim 2, further comprising providing a second nonwoven layer, applying moisture curable 100% solids polyurethane reactive resin in an amount of 2 to 30 g/m² to the second nonwoven layer, and laminating the fibrous layer to the second nonwoven layer applied with the moisture curable 100% solids polyurethane reactive resin and pressing.

9. The method of claim 1, wherein the polyurethane reactive resin comprises moisture curable 30% to 80% solids polyurethane in a solvent, and the method further comprising removing the solvent after the applying step by volatilizing at a temperature of 40° C. to 120° C.

10. The method of claim 9, further comprising winding the fibrous layer at a process tension of 3 kilogram-force (kgf) or less.

11. The method of claim 9, further comprising providing a second nonwoven layer, applying a polyurethane reactive resin in an amount of 2 to 30 g/m$^2$ to the second nonwoven layer, and laminating the fibrous layer to the second nonwoven layer and pressing.

12. The method of claim 9, further comprising curing the fibrous layer at a temperature of 25° C. to 35° C. and a relative humidity of 65% to 80% for 24 to 48 hours.

13. The method of claim 1, wherein the first nonwoven layer comprises a spunbond-meltblown-spunbond (SMS) layer.

14. The method of claim 13, wherein the SMS layer comprises polypropylene or polyester.

15. The method of claim 13, further comprising providing a second nonwoven layer, applying a polyurethane reactive resin in an amount of 2 to 30 g/m$^2$ to the second nonwoven layer, and laminating the fibrous layer to the second nonwoven layer applied with the polyurethane reactive resin and pressing.

16. The method of claim 15, wherein the second nonwoven layer comprises a spunbond-spunbond (SS) layer.

17. The method of claim 16, wherein the SS layer comprises polypropylene or polyester or polyamide.

18. The method of claim 15, wherein the first nonwoven layer comprises a spunbond-meltblown-spunbond (SMS) polyester layer, and the second nonwoven layer comprises a spunbond-spunbond (SS) polyester layer.

19. The method of claim 15, wherein in applying the polyurethane reactive resin to the second nonwoven layer, the polyurethane reactive resin is heated at a temperature of 50° C. to 60° C.

20. The method of claim 1, wherein in applying the polyurethane reactive resin to the first nonwoven layer, the polyurethane reactive resin is heated at a temperature of 50° C. to 60° C.

\* \* \* \* \*